W. J. DAVIS.
TEMPERATURE CHANGING APPARATUS FOR LIQUIDS.
APPLICATION FILED APR. 18, 1918.
1,307,728.
Patented June 24, 1919.
3 SHEETS—SHEET 1.
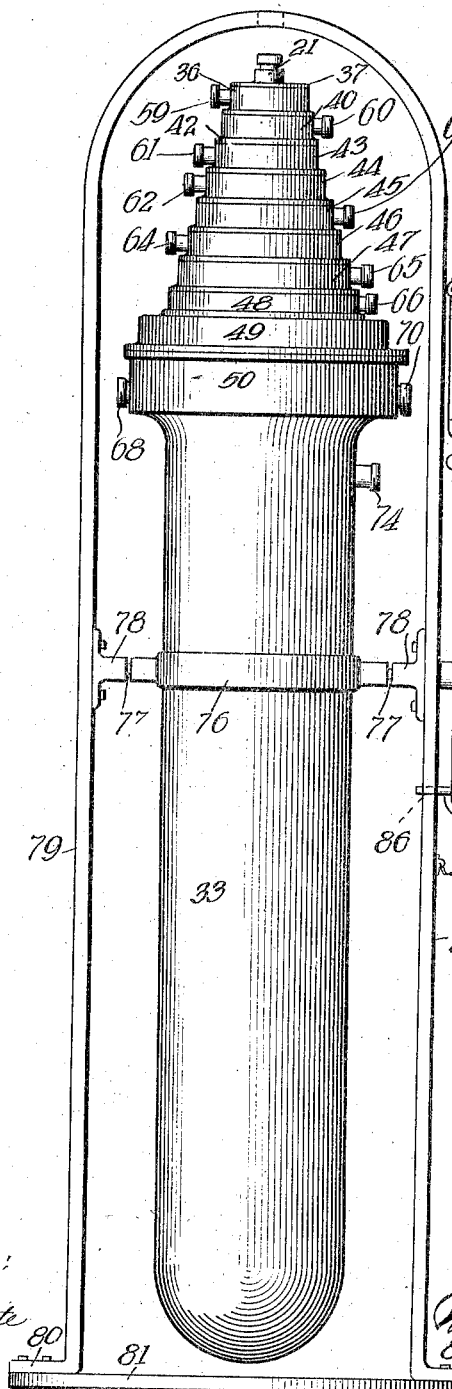
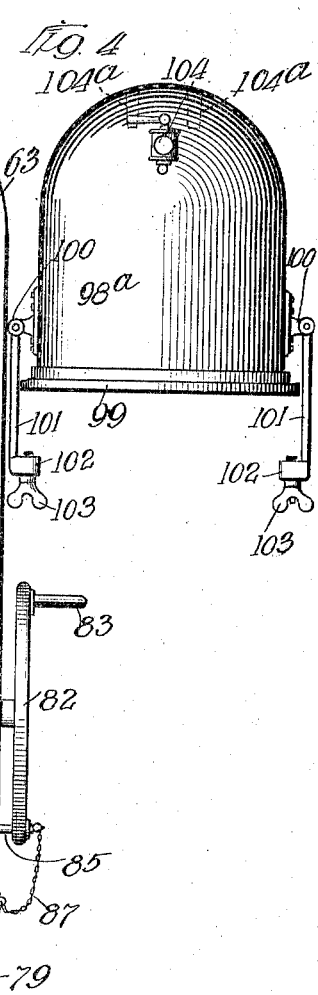

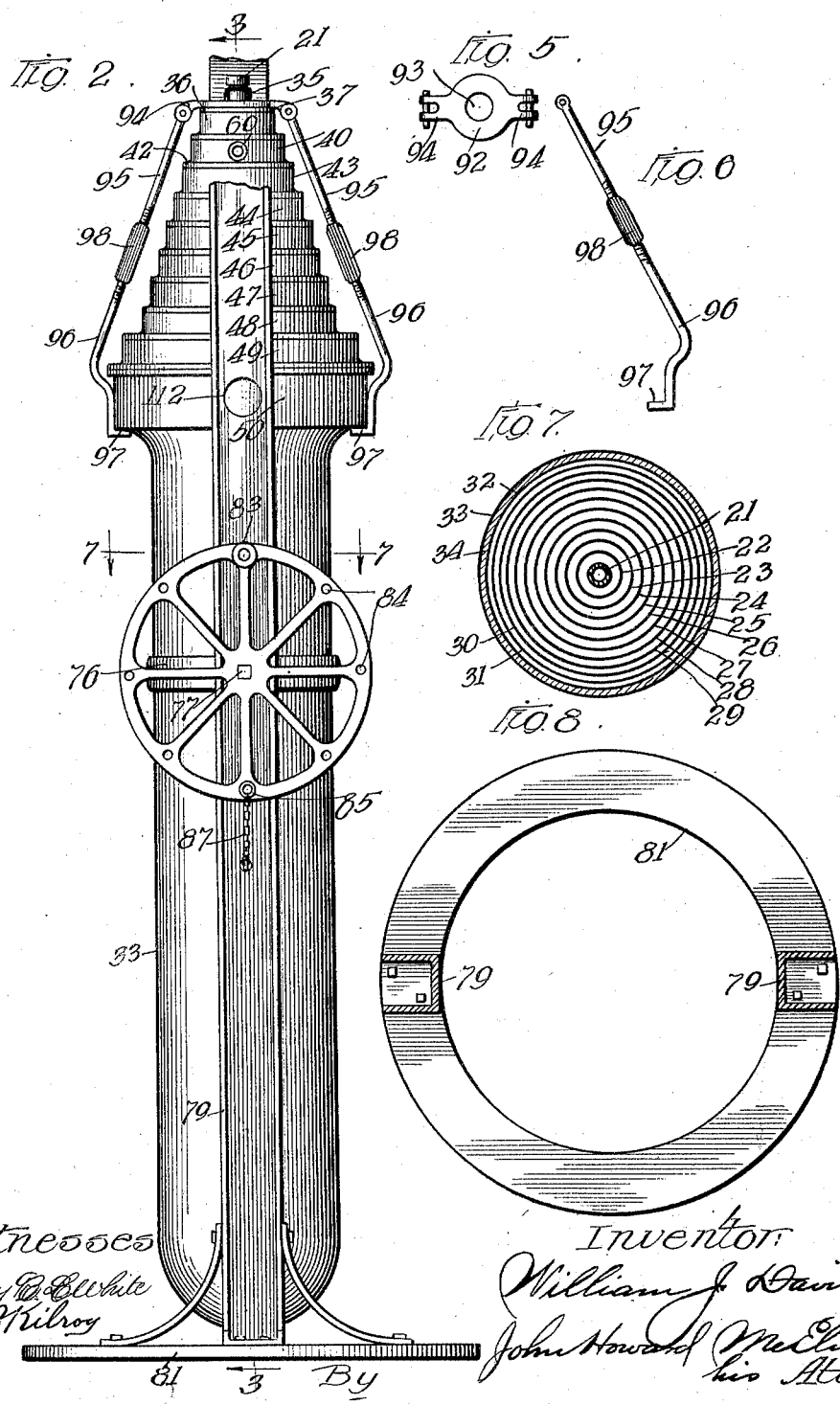

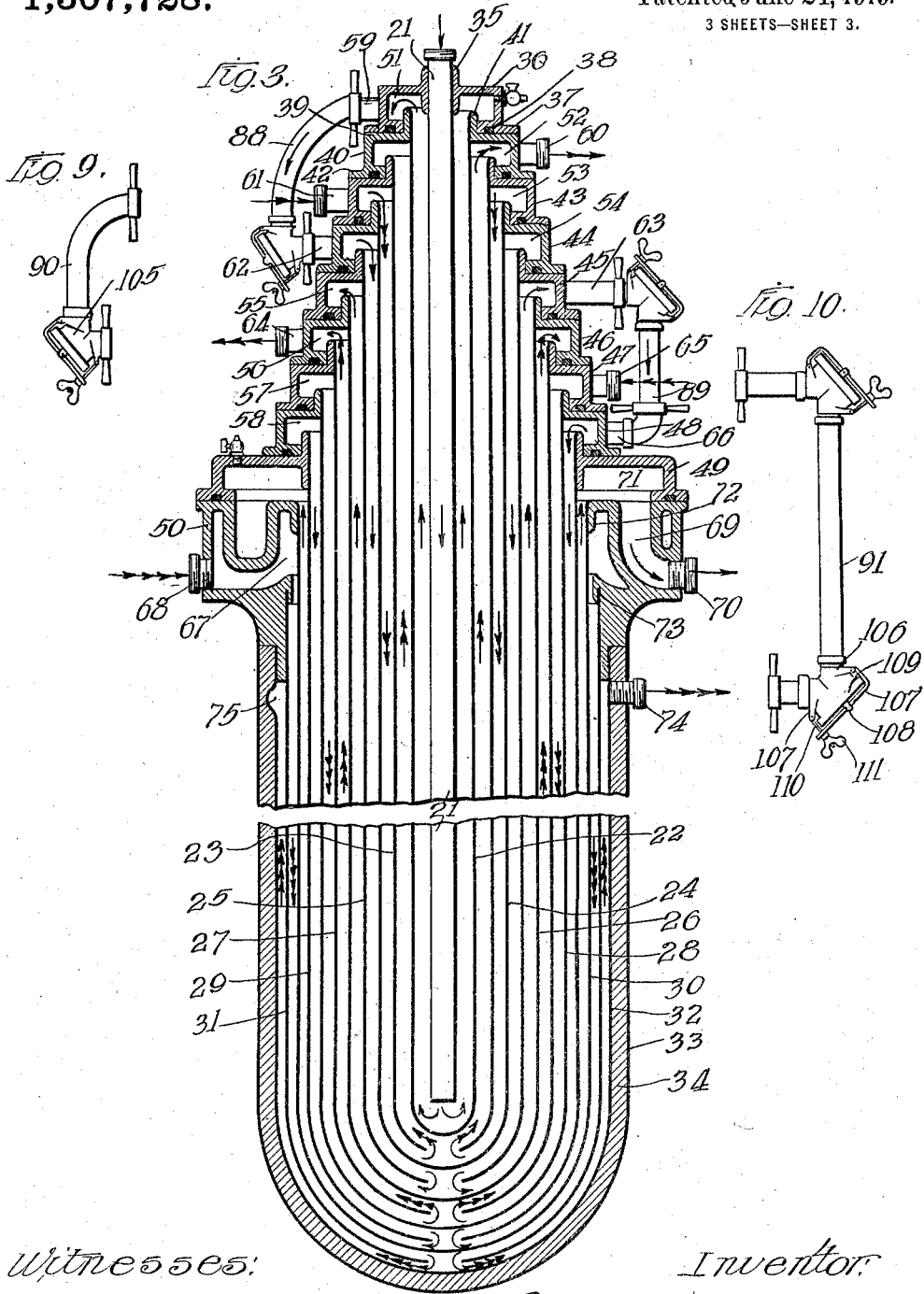

UNITED STATES PATENT OFFICE.

WILLIAM J. DAVIS, OF CHICAGO, ILLINOIS.

TEMPERATURE-CHANGING APPARATUS FOR LIQUIDS.

1,307,728.  Specification of Letters Patent.  Patented June 24, 1919.

Application filed April 18, 1918. Serial No. 229,344.

*To all whom it may concern:*

Be it known that I, WILLIAM J. DAVIS, a citizen of the United States, and a resident of Chicago, in the county of Cook and State of Illinois, have invented certain new and useful Improvements in Temperature-Changing Apparatus for Liquids, of which the following is a full, clear, and exact specification.

My invention is concerned with a novel structure designed primarily for use in the pasteurizing of milk, but which may be used for similar purposes where the heat of one stream of liquid is to be transferred to another stream to raise or lower its temperature, as the case may be, and is designed to produce a structure of the class described which shall be simple in its construction and capable of being readily cleaned throughout, efficient in its operation, and which shall occupy a small floor space and which can be readily grouped with the other devices going to make up a complete pasteurizing and bottling unit.

It is further constructed so that a single unit can be employed for regeneration, as the raw milk may have its temperature raised toward the pasteurizing point as it flows past the hot milk from the holder; likewise for water cooling, after the partially cooled milk has passed the raw milk and transferred some of its heat to the raw milk; and finally for brine cooling, after it has passed the cold water section, all at a single operation; or it can be coupled up so that the entire unit can be used for heating or cooling by passing the liquid to be treated past a single hot or cold liquid which traverses the entire tortuous passage, it being understood that it is provided with two sets of tortuous passages unconnected, but separated only by thin metallic walls so that the two or more liquids passing therethrough, preferably in opposite directions, can transfer their heat readily for the purposes described.

To illustrate my invention, I annex hereto three sheets of drawings in which the same reference characters are used to designate identical parts in all the figures, of which—

Figure 1 is a side elevation of the apparatus with the various connecting pipes removed;

Fig. 2 is a similar view at a position at right angles to that of Fig. 1;

Fig. 3 is a central vertical section, as on the line 3—3 of Fig. 2, but on an enlarged scale, and with a portion of the apparatus broken away and the framework omitted;

Fig. 4 is a side elevation of a cover which may be employed in washing the apparatus;

Figs. 5 and 6 are detached views of the yoke and one of the hooks forming the clamping mechanism by which the different units are secured together;

Fig. 7 is a section through the apparatus, omitting the framework, as seen on the line 7—7 of Fig. 2;

Fig. 8 is a plan view of the base; and

Figs. 9 and 10 are detached views of two connecting attachments which may be employed when it is desired to use a single treating fluid.

In its ordinary use, the milk to be treated is admitted to the top of the central pipe 21, which, as is best seen in Fig. 3, is centrally located in and extends substantially to the bottom of the elongated cup-like cylinder 22, the body of which is formed of thin sheet metal, and which will be supported in the manner to be described. This in turn is centrally supported in a sleeve 23, similarly constructed and supported, but having an opening in its bottom, as indicated by the arrows showing how the liquid flows therethrough. This in turn is supported in the cup-like cylinder 24, which in turn is supported in the sleeve 25, which in turn is supported in the cylinder 26, which in turn is supported in the sleeve 27, which in turn is supported in the cylinder 28, which in turn is supported in the sleeve 29, which in turn is supported in the cylinder 30, which in turn is supported in the sleeve 31, which in turn is supported in the outer casing, which is preferably made up of the two similar thin metallic cup-like cylinders 32 and 33 which have the space between them filled with any suitable heat retaining packing 34. All these sleeves and cylinders are concentric, and their bottoms are preferably formed as half spheres, and their dimensions are preferably proportioned, although not accurately so illustrated, so that the area of the annular passages between the adjacent sleeves and cylinders will be substantially the same throughout so that the milk and treating fluids will have the same velocity throughout, although it will be understood that this is not necessary and might under some conditions preferably be varied.

The pipe 21 is open throughout its length, and is secured at its upper end in the vertical sleeve 35 formed in the center of the head 36, which is preferably a casting of a generally inverted cup-shape, and which has at its bottom the sealing flange 37, which is provided in its under surface with an annular recess in which is placed a packing 38. The bottom of this sealing flange 37 coöperates with the top sealing flange 39 of the head 40 connected with the cylinder 22, which head 40 is provided with the central annular vertical flange 41 to the inner face of which the top of the cylinder 22 is secured. The bottom of the head 40 is provided with a sealing flange 42 just like the flange 37 of the head 36 except that it is necessarily larger, and the sleeves and cylinders 23, 24, 25, 26, 27, 28 and 29 are provided with the similar heads 43, 44, 45, 46, 47, 48 and 49, which are all similarly constructed, and all of substantially the same design except that their diameters necessarily increase, with the exception of the head 49 which has its diameter very materially increased as it coöperates with the larger top piece 50 of the outer casing. Each of these heads 36, 40, 43, 44, 45, 46, 47 and 48, coöperating with the inner vertical flange of the head just beneath it forms an annular channel 51, 52, 53, 54, 55, 56, 57 and 58, respectively, and each head has opening in its respective channel a short threaded connection, 59, 60, 61, 62, 63, 64, 65 and 66, respectively, and to these connecting tubes are applied connections to be subsequently described. While I have illustrated a certain definite number of these units each made up of a cylinder or sleeve with its associated head and short connection, it will be understood that any desired number may be employed, and while I have for convenience of illustration shown these connections 59, 60, 61, 62, 63, 64, 65 and 66 as if they were all in substantially the same vertical plane, it will be understood that they will be disposed in different planes as may be necessary for making convenient connections without interference between the various detachable connecting elements. The top or head piece 50 of the casing is preferably constructed of a hollow casting, and has the annular hollow passage 67 formed therein which opens to the outside through the short threaded connection 68. This head 50 also has therethrough the small short curved passage 69 which is provided at its outer end with the connection 70 similar to the connection 68, and which at its upper end opens into the annular passage 71 similar to the passages 51, 52, etc., and formed between the head 49 and top 50. As already noted, the head 49 has the sleeve 29 secured thereto, and the top piece 50 has the uppermost downwardly projecting annular flange 72 to which is secured the top of the cylinder 30. It also has beneath this a larger annular flange 73 to which is secured the sleeve 31. The main casing has passed therethrough just beneath the top casting 50 the connection 74, and at the same level, the cylinder 32 has preferably formed therein the annular channel 75 to facilitate the escape of the treating liquid from the connection 74.

The casing 33 has rigidly secured around it at substantially its center of gravity when the removable connections are detached, the ring 76, which is provided with a pair of trunnions 77 journaled in the bearings 78 secured on the inner side of the inverted U-shaped frame 79, which is preferably formed of a shallow channel bar, having the feet 80 formed on the bottom thereof and bolted, or otherwise rigidly secured, to the annular base 81. The right-hand trunnion 77, as seen in Fig. 1, extends through the bearing 78 and the adjacent side of the frame 79 and has secured thereon a hand wheel 82, which is provided with a handle 83 and which preferably has a plurality of apertures 84 in its periphery through any one of which a pin 85 can be passed into an aperture 86 formed in the adjacent side of the frame so as to lock the casing in any desired position relative to the vertical. A chain 87 connected to the pin 85 and the framework 79 prevents the loss or displacement of the pin.

When the apparatus is to be used for cooling with water and brine and the regenerating action of the raw milk, the short connections 59 and 62 are connected by the connecting pipe 88, and similarly the short connecting pipes 63 and 66 are connected by the connecting pipe 89. The pipe 21 is connected at its upper end to the supply of hot milk from the holder, and the supply of raw milk will be connected to the short pipe 61 through which it enters, and it will emerge from the apparatus through the short pipe 60 which is connected by piping to the heating coil, or whatever apparatus is used to raise the raw milk to the pasteurizing temperature. The cold water supply is connected to the short pipe 65, through which the cold water enters, and it emerges from the short connecting pipe 64 and is delivered wherever desired. The piping from the brine supply is connected to the connection 68, and emerges from the connection 74 and is carried by piping to whatever point is desired.

I have indicated the passage of the pasteurized milk through the apparatus by the arrows with a single head, and said passage will be as follows: It descends through the pipe 21 and rises between said pipe and the cylinder 22, and overflows into the channel 51 and passes out through the short connecting pipe 59 into the connection 88. As it rises in the annular passage between the pipe 21 and the cylinder 22, it is subjected to the cold of the raw milk, the passage of which through the apparatus is indicated by the two-headed arrows, and which enters at 61 and passes down through the annular passage between the cylinder 24 and the sleeve 23, rising between the sleeve 23 and the cylinder 22, and acting to lower the temperature of the hot milk which is separated therefrom only by the thickness of the thin heat conveying metallic cylinder 22. Somewhat cooled by the raw milk, the pasteurized milk flows down through the connection 88 through the short connecting pipe 62 and into the channel 54, and down through the annular passage between the sleeve 25 and the cylinder 24, and during this downward movement it is again subjected to the action of the cold raw milk which is separated therefrom only by the thickness of the thin metallic cylinder 24. At the end of its downward movement, it passes through the aperture in the sleeve 25 and rises between said sleeve 25 and the cylinder 26, and as it rises, it is exposed to the action of the cold water, which is rising between the sleeve 27 and the cylinder 26, and the passage of which through the apparatus is indicated by the three-headed arrows. The cold water enters through the connection 65 which is attached to a pipe leading to the cold water supply, and flows down between the cylinder 28 and the sleeve 27, and rises between the sleeve 27 and the cylinder 26 and escapes through the connection 64. The pasteurized milk rising between the sleeve 25 and the cylinder 26 flows out through the short connecting pipe 63 down through the connection 89, and through the connection 66 into the passage 58, and down between the cylinder 28 and the sleeve 29 during which passage it is cooled by the cold water flowing down between the cylinder 28 and the sleeve 27. At the end of its downward movement, the milk passes through the aperture in the bottom of the sleeve 29, and rises between said sleeve 29 and the cylinder 30, and during its rise, it is cooled by the action of the brine, flowing down between the cylinder 30 and the sleeve 31. The brine enters through the connection 68 attached by suitable pipes to the brine supply, and flows through the channel 67 and down between the cylinder 30 and the sleeve 31, passing at the bottom through the aperture in said sleeve 31 and rising between the sleeve 31 and the cylinder 32 to the channel 75, whence it escapes through the connection 74 which will be attached to suitable pipes leading to the discharge for the brine. The now thoroughly cooled milk rising between the cylinder 30 and the sleeve 29 enters the annular passage 71 and flows down through the passage 69 and the connection 70, to which will be connected a pipe leading to the bottling apparatus.

With the connections heretofore described, the pasteurized milk is subjected to the successive cooling action of the raw milk, the cold water and the brine, but if for any reason it is desired to subject it to the action of only one of these cooling liquids, I detach the pipes to the raw milk supply and to the cold water discharge, and connect the pipes 61 and 64 by a special connection 90, seen in Fig. 9, and similar to the connection 88. Likewise, I disconnect the pipes leading from the cold water supply and to the brine discharge, and connect the pipes 65 and 74 by the special connection 91, shown in Fig. 10 as separated therefrom but opposite to said pipes. With this arrangement, the raw milk, cold water or brine, as the case may be, is connected up so as to either enter or leave through the connections 68 and 60, as may be desired, and with this arrangement, it will be apparent that the single cooling liquid will flow through the entire cooling liquid passages in the device, which passages are, as has already been explained, alternated with the milk passage.

To hold the heads assembled so that the packing 38 in each of the heads will make the entire system liquid tight I employ the clamping mechanism shown in Figs. 2, 5 and 6, where it will be seen that a yoke 92 has a central aperture 93 therein adapted to receive the pipe 21 and the flange 35 on the head 36, and said yoke also has two pairs of ears 94 between which are pivoted a pair of hooks 95, which are made in two parts, the lower part 96 having the hook end 97 adapted to catch underneath the protruding horizontal bottom portion of the top piece 50. Each of the portions 95 and 96 of the hook are oppositely screw-threaded and a turnbuckle 98 connecting the two pieces is turned in one direction to loosen the clamp so that it can be removed, and in the other direction to tighten it. By this simple construction a few turns of the buckles 98 serve to clamp securely all the various sections together, and when it is desired to disassemble them for a thorough cleansing all that is necessary is to give the buckles 98 a few turns and thus loosen the clamps and when the various connections 88, 89, 90 and 91, or the equivalent pipes are disconnected, the apparatus can be turned down into a horizontal position and all the cylinders pulled out and washed separately.

It will be obvious that they can be cleansed quite thoroughly by connecting them up so as to throw the necessary cleansing fluids through the continuous milk passage in the same or the opposite direction to which the milk flows and similarly cleansing fluids can be passed through the raw milk passage or even through the cold water and brine passage, if desired. Another method of cleansing would be to disconnect all the pipes and place over the entire set of heads the cap or cover 98ª, shown in Fig. 4, which is a cup of the proper size to embrace all of the heads and having the flange 99 at the bottom thereof of the proper size to rest on the lowermost flange of the head 49. To secure the head in place, a pair of ears 100 are secured to the sides thereof and pivoted in these ears are the links 101 having the inwardly projecting nut portions 102 through which are passed the wing bolts 103 which can be turned up to coöperate with the under side of the top 50 in the same general manner as the hooks 97 of the clamping mechanism. A valve controlled connection 104 is placed in the cap 98 so that after it has been put in place, water or other cleansing fluid can be admitted therethrough, and it will then flow through the various passages and emerge from the connection 70. The cap 98 has on its inner surface a couple of downwardly projecting lugs 104$^a$, shown in dotted lines in Fig. 4, which are designed to engage the top of the head 36 and thus hold all the various heads together.

In the connections 88, 89, 90 and 91, I have shown a readily cleaned elbow connection 105, which is especially desirable for this class of connections, and it will be apparent that said connection 105 has the two entrance and exit apertures at right angles to each other and that adjacent to each of said apertures is a pair of ears 106 and 107, and that pivoted between the ears 106 is an angular bar 107 having a fork, not shown, at the other end, and that pivoted centrally to this arm 107 at 108 is a cap disk 109 adapted to cover a large cleansing aperture extending at an angle of 45 degrees to the inlet and exit apertures. Pivoted between the ears 107 is a bolt 110 adapted to enter the forked end of the arm 107 and provided with a wing nut 111 which can be turned down to clamp the cap 109 securely in position.

The stand or frame 79 adjacent to the various short connecting pipes 60, 61, 64, 65, 68, 70 and 74 is preferably provided with apertures 112 which serve to hold in position pipes connected to the above mentioned short pipes.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new and desire to secure by Letters Patent of the United States is:—

1. In a device of the class described, the combination with a frame, of a rotatable casing mounted in said frame, means in said casing forming a series of tortuous passages therethrough adjacent other separated passages, detachable connections at one end of the casing for determining what liquids shall normally flow through the various passages, and a cover for the connections end of the casing applicable thereto when the detachable portions of the connections are removed so that cleansing fluid can pass through all the passages as the casing is rotated.

2. In a device of the class described, a combination with a suitably supported, generally cylindrical outer casing closed at the bottom and provided with a head having a sealing flange at the top, of a plurality of generally similar thin metallic cylinders nested therein and separated from the adjacent cylinders, the alternate cylinders beginning with the one next to the casing being open at the bottom for the purpose described, and each of said cylinders being provided with a head having a sealing flange and apertures for connections, and means for clamping all of said heads together to form a series of concentric annular passages, substantially as and for the purpose described.

3. In a device of the class described, a unit consisting of an annular head having an annular top surface to receive the superimposed head of the adjacent internal unit with a vertical flange projecting upward from the inner edge of said top surface and an annular bottom surface to rest on the annular top surface of the adjacent external unit, and a cylindrical sheet metal body secured to the inner wall of the vertical flange extending downwardly therefrom.

4. In a device of the class described, the combination with a casing having an open head, of a plurality of cylinders nested therein, each having an open head and the alternating ones having open bottoms, and clamping mechanism engaging the underside of the head of the casing and the upper side of the head of the innermost cylinder to clamp said casing and all of said cylinders together to form a plurality of concentric passages, substantially as and for the purpose described.

5. In a device of the class described, the combination with a casing having an open head, of a plurality of cylinders nested therein, each having an open head and the alternating ones having open bottoms, and clamping mechanism engaging the under side of the head of the casing and the upper side of the head of the innermost cylinder to clamp said casing and all of said cylinders together to form a plurality of concentric passages, said clamping mechanism consisting of a yoke to engage the uppermost head and a pair of hooks provided with a turnbuckle connecting their adjacent ends for the purpose described.

6. In a device of the class described, a unit consisting of an annular head having an annular top surface to receive the superimposed head of the adjacent internal unit with a vertical flange projecting upward from the inner edge of said top surface and an annular bottom surface to rest on the annular top surface of the adjacent external unit, said bottom surface having an annular packing groove therein, and a cylindrical sheet metal body secured to the inner wall of the vertical flange extending downwardly therefrom.

7. In a device of the class described, a unit consisting of an annular head having an annular top surface to receive the superimposed head of the adjacent internal unit with a vertical flange projecting upward from the inner edge of said top surface and a second vertical flange extending downward from the outer edge of said top surface, said second vertical flange having a connection port therein, and an annular bottom surface to rest on the annular top surface of the adjacent external unit formed on the bottom of said second vertical flange, and a cylindrical sheet metal body secured to the inner wall of the first vertical flange extending downwardly therefrom.

In witness whereof, I have hereunto set my hand and affixed my seal, this 16th day of April A. D. 1918.

WILLIAM J. DAVIS. [L. S.]

Witness:
JOHN HOWARD MCELROY.

Copies of this patent may be obtained for five cents each, by addressing the "Commissioner of Patents, Washington, D. C."